United States Patent
Kunc et al.

(10) Patent No.: US 11,199,517 B2
(45) Date of Patent: Dec. 14, 2021

(54) SELF-SENSING OF PRINTED POLYMER STRUCTURES

(71) Applicant: UT-Battelle, LLC, Oak Ridge, TN (US)

(72) Inventors: Vlastimil Kunc, Knoxville, TN (US); Ahmed A. Hassen, Knoxville, TN (US); Pooran C. Joshi, Knoxville, TN (US); Seokpum Kim, Knoxville, TN (US); John M. Lindahl, Powell, TN (US); Chad E. Duty, Loudon, TN (US); Jordan A. Failla, Knoxville, TN (US); Tyler C. H. Smith, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 150 days.

(21) Appl. No.: 16/539,184

(22) Filed: Aug. 13, 2019

(65) Prior Publication Data

US 2020/0049648 A1 Feb. 13, 2020

Related U.S. Application Data

(60) Provisional application No. 62/717,920, filed on Aug. 13, 2018.

(51) Int. Cl.
*G01N 27/20* (2006.01)
*B33Y 40/00* (2020.01)
(Continued)

(52) U.S. Cl.
CPC ............. *G01N 27/20* (2013.01); *B29C 64/30* (2017.08); *B33Y 40/00* (2014.12); *G01N 27/041* (2013.01)

(58) Field of Classification Search
CPC ...... G01N 27/041; G01N 27/20; B33Y 40/00; B33Y 30/00; B33Y 10/00; B33Y 50/02; B29C 64/30; B29C 64/393; B29C 64/106
See application file for complete search history.

(56) References Cited

U.S. PATENT DOCUMENTS 3,603,142 A * 9/1971 Saylak ................. G01N 27/205
73/776
5,184,516 A * 2/1993 Blazic ....................... G01B 7/16
73/799
(Continued)

FOREIGN PATENT DOCUMENTS

WO WO-2018017096 A1 * 1/2018 ............. B33Y 50/02

OTHER PUBLICATIONS

Dally et al., "Conductive polymers as fatigue-damage indicators" (Year: 1972).*
(Continued)

*Primary Examiner* — Tung X Nguyen
*Assistant Examiner* — Feba Pothen
(74) *Attorney, Agent, or Firm* — Warner Norcross + Judd LLP

(57) ABSTRACT

A structural health monitoring method is provided that utilizes self-sensing printed polymer structures. The method is based on resistivity properties of conductive materials, which can be integrated to a 3D printed polymer structure during additive manufacturing. An article to be monitored has at least one 3D printed polymer structure including a circuit comprising at least one conductive pathway extending through a non-conductive material. The resistance across the circuit is measured during or after loading of the article to determine a resistance value. The measured resistance value is compared to a known resistance value, and based on the comparison, a defect can be detected in the 3D printed polymer structure. Structural health monitoring systems and
(Continued)

articles with integrated structural health monitoring are also provided.

11 Claims, 10 Drawing Sheets

(51) Int. Cl.
*B29C 64/30* (2017.01)
*G01N 27/04* (2006.01)

(56) References Cited

U.S. PATENT DOCUMENTS

| | | | | |
|---|---|---|---|---|
| 5,227,731 | A * | 7/1993 | Prabhakaran | G01N 19/08 |
| | | | | 324/699 |
| 10,234,342 | B2 | 3/2019 | Moorlag et al. | |
| 2005/0284232 | A1* | 12/2005 | Rice | G01N 27/205 |
| | | | | 73/762 |
| 2016/0236414 | A1* | 8/2016 | Reese | B33Y 50/02 |
| 2017/0184525 | A1* | 6/2017 | Hucker | G01N 33/442 |
| 2018/0311891 | A1 | 11/2018 | Duty et al. | |
| 2019/0091927 | A1 | 3/2019 | Kune et al. | |
| 2019/0143605 | A1* | 5/2019 | Huang | B33Y 30/00 |
| | | | | 425/135 |

OTHER PUBLICATIONS

Thomas, "3D printed 'Smart' machine components alert users to damage and wear", Aug. 8, 2018, http://www.3ders.org/articles/20180808-3d-printed-smart-machine-components-alert-users-to-damage-and-wear.html.
Colin Poitras, "'Smart' Machine Components Alert Users to Damage and Wear", Jul. 30, 2018, UConn Communications, pp. 1-6.
Ahmed Arabi Hassen, John Lindahl, Brian Post, Lonnie Love, (2016), "Additive Manufacturing of Composite Tooling Using High Temperature Thermoplastic Materials", ResearchGate, Conference Paper—May 2016.
Thierry Rayna, Ludmila Striukova, (2016), "From rapid prototyping to home fabrication: How 3D printing is changing business model innovation", Technological Forecasting and Social Change, vol. 102, pp. 214-224.
Cristian Zaharia et al., (2017) "Digital Dentistry—3D Printing Applications", Journal of Interdisciplinary Medicine, 2(1), pp. 50-53.
Ahmed Arabi Hassen, Michel M. Kirka, (2018), "Additive Manufacturing: The Rise of a Technology and the need for Quality Control and Inspection Techniques", Materials Evolution, 76(4), pp. 439-451.
Lawley, Parker, (2015), "Applications of Ultrasonic Non-Destructive Testing in 3D Printing", The Journal of Undergraduate Research, vol. 13, Article 4.
Strantza, Maria et al., "Evaluation of SHM System Produced by Additive Manufacturing via Acoustic Emission and Other NDT Methods", downloaded Jul. 29, 2019, https://www.mdpi.com/1424-8220/15/10/26709, pp. 1-10.
Anna Bellini and Selcuk Guceri, "Mechanical characterization of parts fabricated using fused deposition modeling", Rapid Prototyping Journal, vol. 9, No. 4, 2003, pp. 252-264.
Ahmed Arabi Hassen, Hossein Taheri, Uday K. Vaidya, "Non-destructive investigation of thermoplastic reinforced composites". Composites Part B 97 (2016), pp. 244-254.

* cited by examiner

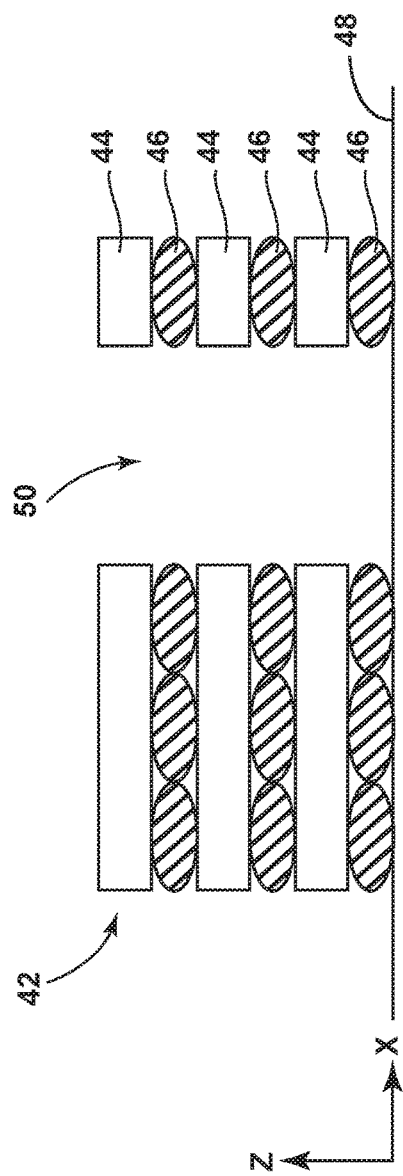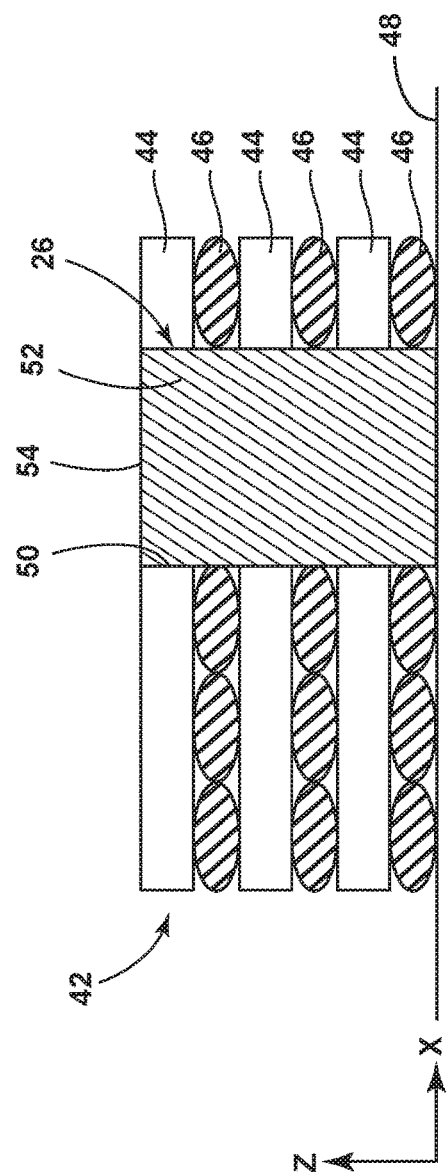

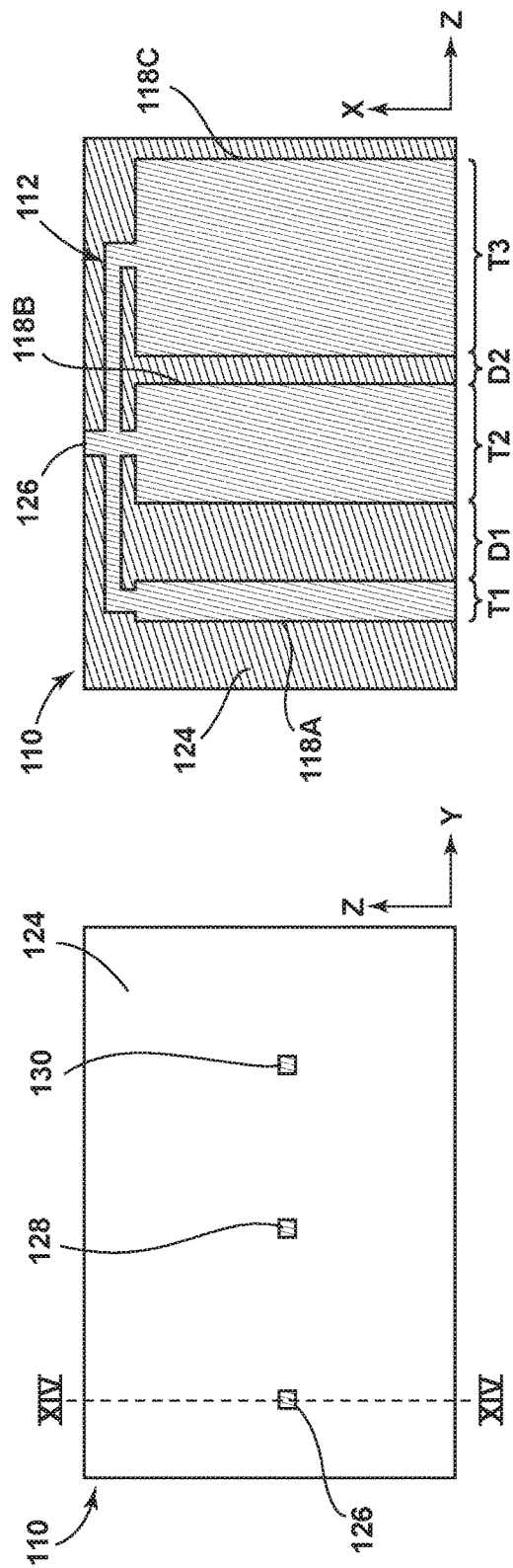
FIG. 13
FIG. 14
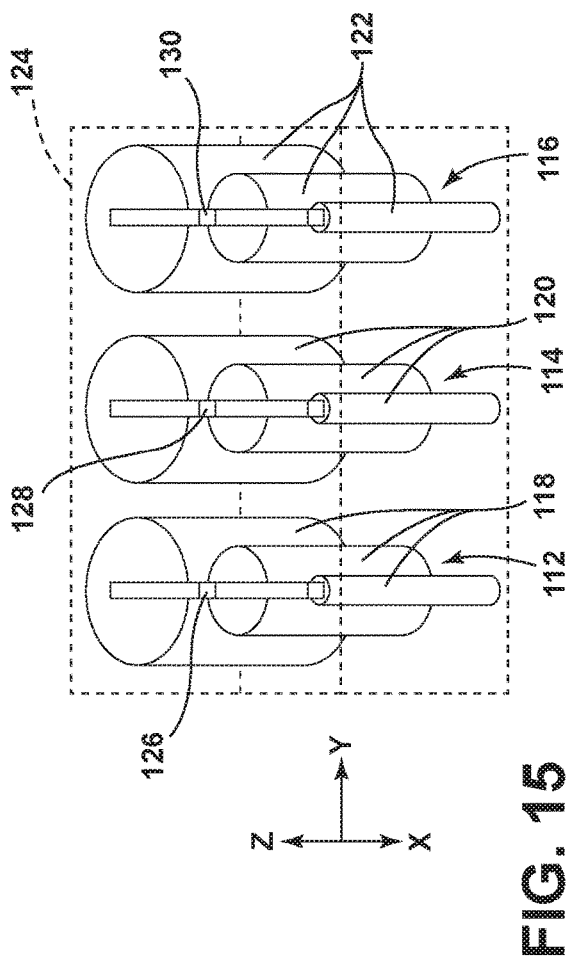
FIG. 15

SELF-SENSING OF PRINTED POLYMER STRUCTURES

CROSS-REFERENCE TO RELATED APPLICATION

This application claims the benefit of U.S. Provisional Application 62/717,920, filed Aug. 13, 2018, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to 3D printing or additive manufacturing, and more particularly to monitoring the structural health of 3D printed polymer-based articles.

3D printed parts are used in industry for both tooling application and smaller parts in assembled structures. Articles made through polymer based additive manufacturing are anisotropic and may have defects throughout the part. For instance, the layer-to-layer interactions are weaker than the in-plane printing, which can cause delamination of the layers. Identifying when and where cracks form can be very difficult if the cracks are inside the structure.

Rapid advancements in the field of additive manufacturing (AM) have led companies to produce both large-scale and small-scale printers varying in size and feedstock material options. This has facilitated the expansion of AM to cover a wide variety of applications, ranging from small demonstration articles to large tools and dies for composite manufacturing. One of the most common polymer AM methods is fused filament fabrication (FFF) or extrusion deposition, in which a printed part is built by extruding melted plastic layer by layer until the desired structure is achieved. Small scale printers have a limited build size of about 929 cm$^2$ and are relatively slow in speed (for example, on the order of 100 mm/sec). Small-scale printers use low-cost feedstock materials that come in a filament form such as polylactic acid (PLA) or acrylonitrile butadiene styrene (ABS). Mid-scale printers (i.e. printers having a build size up to about 5574 cm$^2$) such as the Stratasys F900 or large-scale printers (i.e. printers having a build size up to about 46,652 cm$_2$) such as the BAAM (Big Area Additive Manufacturing) can print feedstock materials having a high melting point, such as polyetherimide, polyphenylsulfone (PPSU) or polyphenylene sulfide (PPS). FFF systems can be used in various applications including dental implants, small-scale prototypes, and large-scale applications such as molds, trim tools, and dies.

Structures printed through FFF methods have anisotropic properties, and a good understanding of the feedstock material's rheological and thermal properties is needed in order to fabricate structures with minimal defects. There are several types of defects can be formed in a structure during the FFF process, such as voids, porosity, and cracks. Defects such as micro-cracks and layer desponding can lead to a catastrophic failure of the printed structure. These defects occur due to several factors, such as an uneven heat profile during the print, porosity in the feedstock material, small clogs in the printing nozzle, etc. Engineering polymers such as polylactic acid (PLA) or acrylonitrile butadiene styrene (ABS) are used for 3D printing, but the strength of the printed structures can be fraction of the cited reference strength for that material, typically from a compressing or injection modeled reference. Neat PLA and ABS structures can be 10-25% weaker in the Z-direction (i.e. the direction perpendicular to X-Y plane in which material is deposited), and 75-90% weaker in the Z-direction when these materials are reinforced with carbon fiber. When external loading is applied and micro-cracks are present, the printed structure will fail far below the designed loading conditions of the structure.

Researchers have investigated several quality control and inspection methods for metal-based AM; however, limited investigations have been conducted for polymer and composite AM. Nondestructive testing and evaluation (NDT/E) methods are quite challenging when performed on polymer and composite materials. A common and standard NDT/E method is ultrasonic testing (UT). This technique is used to detect several types of defects in polymeric material, such as voids, cracks, and delamination. One of the limitations of using UT inspection for 3D printed structures is the topography of the printed surface. In UT inspection, scanning surfaces should be flat to avoid noise and deflection of the ultrasonic waves. Moreover, polymers are highly attenuative materials, and scanning thick printed structures for micro-cracks (i.e. cracks <200 µm) is a challenge. Another common NDT/E method is X-ray inspection. X-ray inspection can scan polymer and polymer reinforced materials, but is limited as part thickness increases. Most of these techniques are localized techniques that require disassembling of the desired part (i.e. leading to operation/service downtime), accessibility of the surfaces to be scanned, long inspection time, and, in some cases, expensive equipment.

Despite continuing efforts, there remains a need for a reliable structural health monitoring methods that can overcome the limitations of previous monitoring, testing, and evaluation methods. In particular, the remains a need for improved structural health monitoring methods for printed polymer structures.

SUMMARY OF THE INVENTION

In one aspect of the invention, a structural health monitoring method is provided that is based on resistivity properties of conductive materials and can be integrated to a 3D printed polymer structure during the printing process itself.

In one aspect of the invention, a method for monitoring the structural health of an article is provided. An article to be monitored has at least one 3D printed polymer structure including a circuit comprising at least one conductive pathway extending through a non-conductive material. The method can include loading the article, measuring resistance across the circuit during or after loading to determine a resistance value, comparing the measured resistance value to a known resistance value, and determining, based on the comparison, whether a defect is present in the 3D printed polymer structure and the location or length of the defect.

In one embodiment, the method includes measuring resistance across the circuit prior to loading the article to determine the known resistance value. Alternatively, the known resistance value can be calculated or estimated based on the circuit design. Resistance can be measured or monitoring continuously or intermittently before, during, or after loading.

In another embodiment, determining whether a defect is present in the 3D printed polymer structure comprises determining whether the resistance value is greater than the known resistance value. Optionally, the presence of a crack can be determined based on whether a difference between resistance value and the known resistance value is greater than a threshold value.

In still another embodiment, a propagation of a defect within the 3D printed polymer structure or a direction of propagation of a defect within the 3D printed polymer structure is determined.

In yet another embodiment, the article comprises multiple circuits, each circuit comprising at least one conductive pathway through the non-conductive material. Resistance is measured across each circuit and compared to a known resistance value for each circuits. Based on the comparison the presence and location of a defect in the 3D printed polymer structure is determined.

In even another embodiment, the circuit is a parallel circuit having multiple conductive pathways of conductive polymer material. By monitoring for resistance, changes in the parallel circuit that can be correlated to one or more of the conductive pathways, the location and/or length of a defect in the 3D printed polymer structure can be determined. A propagation of a defect or direction of propagation can also be determined. Optionally, the non-conductive and conductive materials can be deposited in multiple layers incremented in a first direction, and the multiple conductive pathways extend along a direction that is substantially perpendicular to the first direction In a further embodiment, the measured resistance value is compared to known resistance values indicative of a break in one or more of the multiple conductive pathways. By determining which conductive pathways comprise a break, the location and/or length of the break can be determined.

In still a further embodiment, an alert can be generated when a defect is detected in the 3D printed polymer structure.

In yet a further embodiment, maintenance can be scheduled to correct a defect when a defect is detected in the 3D printed polymer structure.

In even a further embodiment, the 3D printed polymer structure includes multiple layers of non-conductive polymer material deposited by an additive manufacturing machine in a two-dimensional plane and defining a void area extending through the multiple layers in a direction perpendicular to the two-dimensional plane. A portion of the conductive pathway comprises conductive material that fills the void area.

In another aspect of the invention, a structural health monitoring system is provided for detecting defects in an article. The system can include a sensing circuit embedded in a 3D printed polymer structure of the article, the circuit comprising at least one pathway of conductive polymer material deposited by an additive manufacturing machine. The system can further include a resistance detector configured to monitor the resistance of the circuit and detect changes in resistance and a controller configured to determine if the changes in resistance are indicative of a defect in the 3D printed polymer structure and the location or length of the defect.

The embodiments of the invention can be used for monitoring polymer-based 3D printed structures for internal failures. When a defect or crack forms or propagates in the structure, the conductive material inside the part is damaged or split and the resistance across the conductive pathway increases. By measuring or monitoring resistance, resistance changes can be used to detect when a defect has formed.

These and other features and advantages of the present invention will become apparent from the following description of the invention, when viewed in accordance with the accompanying drawings and appended claims.

BRIEF DESCRIPTION OF THE DRAWINGS

FIG. 5A illustrate an additive manufacturing layer build utilizing Z-pinning, according to one embodiment of this invention, prior to deposition of a conductive polymer material.

FIG. 5B illustrate the additive manufacturing layer build of FIG. 5A, after deposition of a conductive polymer material.

FIG. 13 is a top view of another embodiment of a 3D printed polymer structure, the structure comprising multiple parallel circuits for detecting the formation, propagation, location, and/or length of a crack in three directions.

FIG. 14 is a sectional view of the 3D printed polymer structure of FIG. 13, taken through line XIV-XIV of FIG. 13.

FIG. 15 is a top perspective view of the 3D printed polymer structure of FIG. 13, with a non-conductive material of the structure shown in phantom line to show an array of sensing circuits of the structure.

DETAILED DESCRIPTION OF THE CURRENT EMBODIMENT(S)

Figure 1:
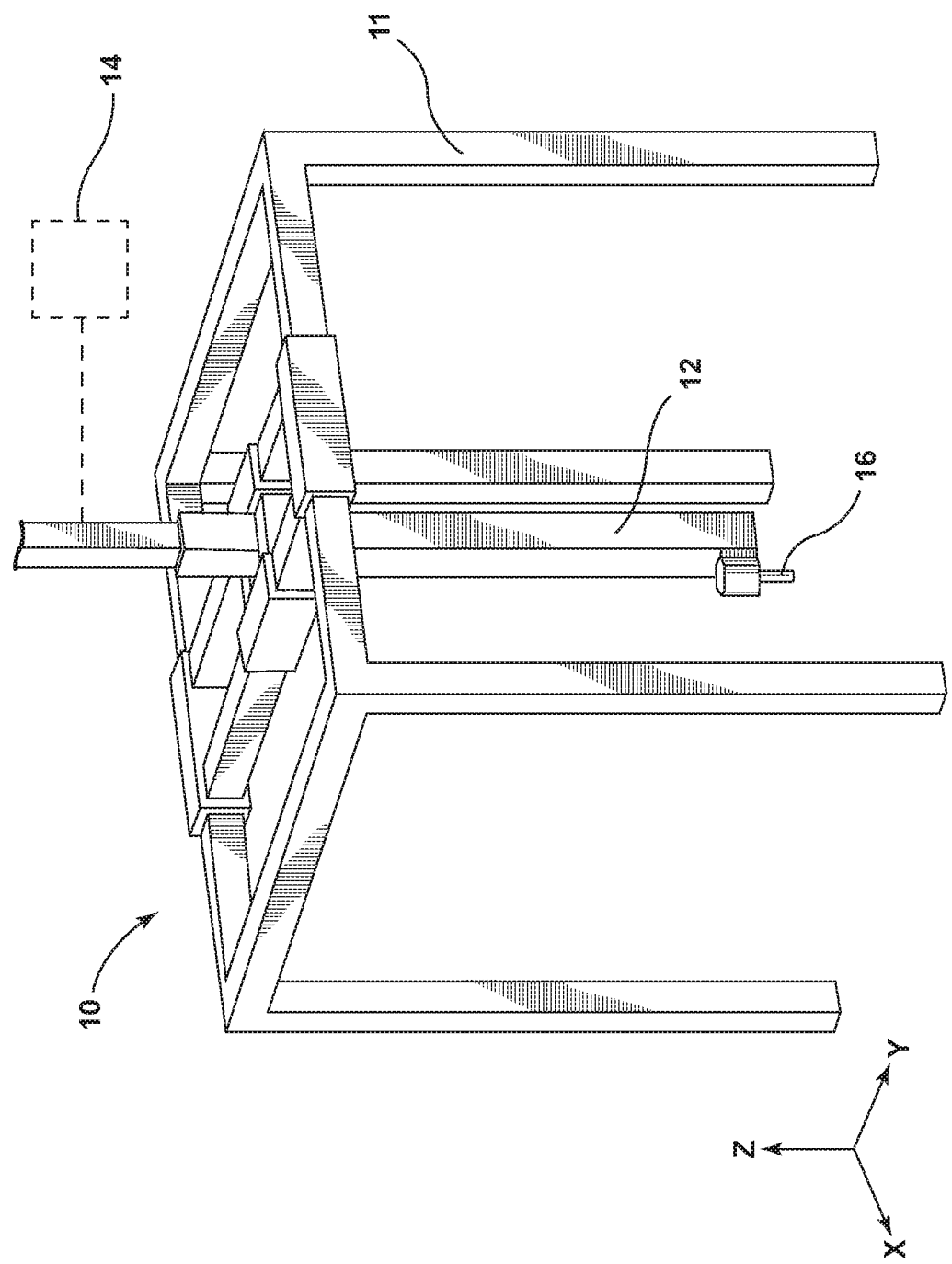
FIG. 1 is a schematic illustration of an additive manufacturing system that can produce a 3D printed polymer structure according to various embodiments of the invention.

The present invention provides articles and methods of manufacturing articles with an embedded structural health monitoring system. The invention also provides methods for using an embedded structural health monitoring system to establish state and structural integrity of an article.

In one embodiment, a method for monitoring polymer-based 3D printed structures for internal failures includes printing a highly sensitive conductive material into the structure itself. When a crack forms or propagates in the structure, the conductive material inside the part is damaged or split. When a section of the conductive material inside the part is damaged or split, the resistance across the conductive pathway increases, indicating that the article has been damaged. These measured resistance changes can be used to alert a user that a crack has formed and/or propagated in the structure.

The method of article manufacture relies on sequential deposition of material beads in predescribed patterns, optionally using fused filament fabrication (FFF), direct write or a combination of thereof. In the context of additive manufacturing, direct write of conductive materials enables embedded electronics within fabricated parts.

Various materials may be used as feedstock for the additive manufacturing process. In this method, two or more materials can be used. At least one material is electrically insulative or non-conductive material. At least one other material is electrically conductive, and is referred to herein as the conductive material. Semi-conductor materials may also be used as the conductive material. Electrical conductivity of insulative materials is less than electrical conductivity of conductive materials. The beads of conductive material are located within and on the non-conductive material so that stresses and damage of the non-conductive material can be established from strains or fractures of the conductive material.

The non-conductive polymer material may be selected according to its insulative and/or mechanical properties. In one example, the non-conductive polymer material comprises a thermoplastic polymer, such as, but not limited to, polylactic acid (PLA) or acrylonitrile butadiene styrene (ABS)

The conductive material may be selected according to its conductive and/or mechanical properties. In one example, the conductive material comprises a polymer material reinforced with a conductive material, such as, but not limited to, graphene, carbon fiber, or a combination thereof. In another example, the conductive material comprises a polymer matrix material having a plurality of conductive additives, the conductive additives optionally comprising a plurality of metallic particulates, a plurality of graphitic particles or a combination thereof. Other conductive and semi-conductive materials can be used.

In some applications, the mechanical properties of the non-conductive and conductive materials can be equivalent. For example, if the application calls for the detection of defects and/or the prediction of failure just before a loading event, or during a loading event, the conductive material may have near equivalent or equivalent mechanical properties to the non-conductive material, i.e. the structural non-conductive polymer material used for a body of an article can be approximately as robust as the conductive material. This may be useful in applications such as monitoring the structural health of an article to determine when routine maintenance should be performed, i.e. after a defect is detected and before a predicted failure. Not only will this potentially prevent failure of an article, but this will also minimize unnecessary maintenance procedures on structurally healthy articles, or articles with only small defects.

Various defects can be detected in polymer-based structures using the methods disclosed herein, including cracks (including micro-cracks), voids, porosity, layer desponding, and delamination. In some embodiments, a location of a defect within the structure can be identified. In some embodiments, a size or length of a defect within the structure can be identified. Complete mechanical failure can also be detected.

The invention can be incorporated in most, if not all, additive manufacturing systems, both large scale and small build machines. Although not required, the subject invention may be used in connection with large-scale polymer additive manufacturing such as the schematic system shown in FIG. 1. FIG. 1 shows an additive manufacturing system 10 having a frame or gantry 11 for containing a build. The gantry 11 preferably contains a deposition arm 12 that is moveable through the X, Y, and Z-axes, via controller 14. The deposition arm 12 preferably accommodates a supply of working material and a deposition head or nozzle 16. The invention is not limited to any particular deposition nozzle 16. In the nozzle embodiment of FIG. 1, the nozzle 16 is particularly useful for a polymeric feedstock material. The supply of working material or feedstock material may be onboard the deposition arm 12 and/or remotely supplied from a wire spool, hopper or similar storage vessel. The additive manufacturing system 10 shown in FIG. 1 is exemplary only, and any type of additive manufacturing system or 3D printer can be used to implement the methods and articles of the present disclosure, including small scale machines, optionally using fused filament fabrication (FFF), direct write or a combination of thereof.

In one embodiment, the conductive paths may be deposited through multiple layers of the build. U.S. Patent Application Publication No. 2018/0311891 to Duty et al., which is incorporated herein by reference in its entirety, discloses a method of joining layers of materials together in the Z-direction (referred to as Z-pinning). The method includes leaving void areas within and through several deposited X-Y layers, and depositing a fill material within the void to pin the X-Y layers together. In one embodiment, a Z-pinning method can be used to deposit conductive material within voids in non-conductive X-Y layers to pin the non-conductive layers together while creating at least one conductive pathway through printed part. The conductive pathway can thereafter be monitored for changes in resistance indicative of a structural defect, and, using z-pinning, the conductive pathways may perform a dual function to improve structural strength in the z-direction. Optionally, the deposition nozzle 16 can be a penetrating nozzle that extends into voids in multiple X-Y layers of the printed part to deposit conductive material within the voids, as disclosed in U.S. Patent Application Publication No. 2019/0091927 to Kunc et al., which is incorporated herein by reference in its entirety.

By using a printer capable of printing two or more materials on the same layer, both the non-conductive material and the conductive material can be deposited on one layer during the print. Because both components of the structure are printed simultaneously, there is no need for post machining. In addition to saving time and cost, the avoidance of post machining can reduce defects, because during a post machining process there is a possibility of damaging the part due to vibration and cutting into the part. Furthermore, the conductive materials used can be selected with consideration of the cost of the material and the criticality of the loading situation. As a result, the overall cost of monitoring 3D printed parts with the embodiments of the method disclosed herein are much less because there is no post machining, chances of cracks or breaks induced by post machining, and by modifying sensing materials to be a lower cost.

Figure 4:
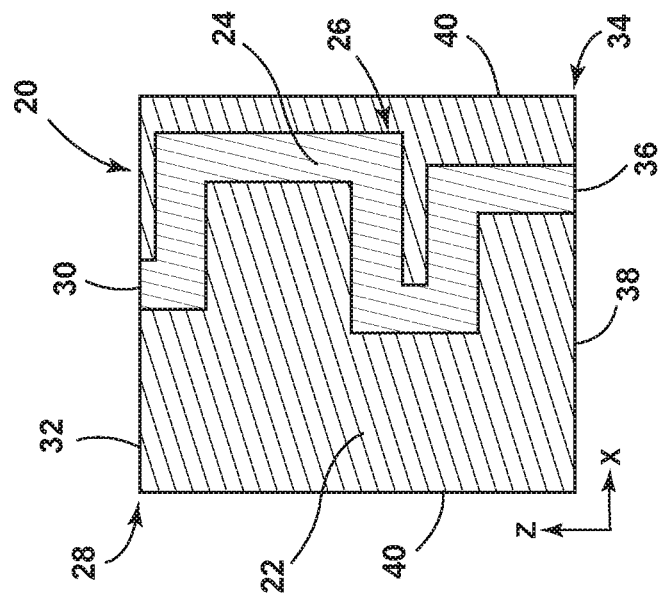
FIG. 4 is a sectional view of the 3D printed polymer structure of FIG. 2, taken through line IV-IV of FIG. 2.
Figure 3:
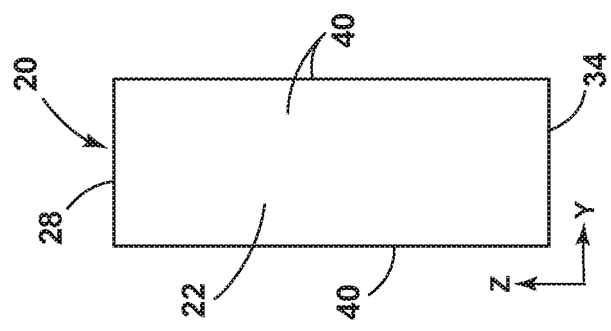
FIG. 3 is a front view of the 3D printed polymer structure of FIG. 2.
Figure 2:
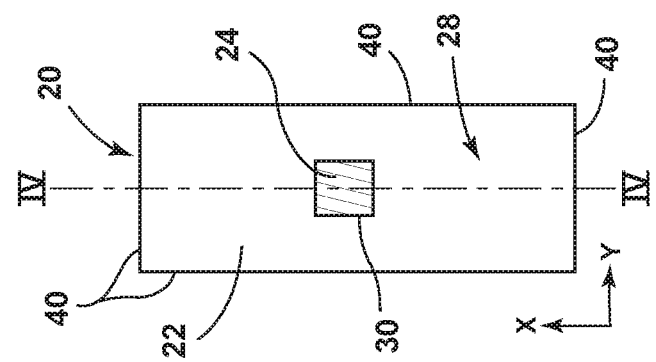
FIG. 2 is a top view of a 3D printed polymer structure according to one embodiment of the invention.

FIGS. 2-4 show a 3D printed polymer structure 20 manufactured according to one embodiment of the present invention. The structure 20 includes an embedded health-monitoring pathway that can be used to detect the formation of cracks in the structure 20. The structure 20 includes an electrically insulative or non-conductive material 22 and an electrically conductive material 24 forming an embedded or integrated sensing circuit in the structure. The circuit shown in FIG. 2 has one conductive pathway 26 for electricity to flow through the structure 20. Although two materials are shown, it understood that more than two materials can be printed. The layers of material are deposited in a 2D or X-Y plane, optionally by deposition nozzle 16 (FIG. 1). Additional layers of material are built up by incrementing in the Z-direction.

In case a crack or other defect propagates in a conductive section of the structure 20, i.e. in the conductive pathway 26, the sensing circuit can be used to detect crack or defect formation. Because the conductive material 24 is printed in the same format as the non-conductive material 22, the layer-to-layer bonding should be similar for both materials. The resultant of this format allows for the layer of the conductive material 24 to separate the same way as the non-conductive material 22 and can be monitored using the sensing circuit.

Using an additive manufacturing process, the two different materials 22, 24 can be deposited within a single layer. For example, a surface layer or exterior surface 28 of the structure 20 includes a first contact pad 30 for the conductive pathway 26 formed by the deposition of the conductive material 24. The rest of the printed layer 28 is an insulator 32 formed by the deposition of the non-conductive material 22. Another surface layer or exterior surface 34 of the structure 20 includes a second contact pad 36 for the conductive pathway 26 formed by the deposition of the conductive material 24. The rest of the printed layer 34 is an insulator 38 formed by the deposition of the non-conductive material 22. The printed layers 28, 34 on which the contact pads 30, 36 are formed are shown herein respectively as a top surface and bottom surface of the structure 20, although the contact pads 30, 36 can be provided on any exterior surfaces of the structure 20, including on the same exterior surface.

The rest of the conductive material 24 forming the conductive pathway 36, i.e. the conductive material 24 between the contact pads 30, 36, can be disposed is inside of the printed structure 20. In the embodiment shown herein, the other side surfaces 40 of the structure 20 are formed from the non-conductive material 22, which shields the conductive material 24 from outside conditions and other hazards. As best seen in FIG. 4, the conductive pathway 26 is shown extending in a serpentine path through the structure 20. The conductive pathway 26 shown in FIG. 4 is exemplary only, and other paths are possible, including other winding or non-winding paths. The conductive pathway 26 can extend in any one or more of the X, Y, and Z directions throughout the structure 20. In addition, while one conductive pathway 26 is provided in the structure 20 of FIGS. 2-4, multiple conductive pathways can be provided in one structure. Some examples of multi-path structures are described in further detail below.

FIGS. 5A-5B illustrate an additive manufacturing layer build 42 utilizing Z-pinning, according to one embodiment of this invention. The layer build 42 can form a portion of the structure 20 from FIG. 2-4. Two-dimensional (X-Y) layers 44, 46 are deposited, optionally by deposition nozzle 16 (FIG. 1), on a build surface 48, with layers 44 deposited at an angle (e.g., 90°) in the X-Y direction to the layers 46. As shown in FIG. 5A, the build 42 includes at least one void area 50 extending in the Z-direction, perpendicular to the X-Y planes, through multiple layers 44, 46. The layers 44, 46 shown in FIG. 5A are built up from the deposition of one or more electrically insulative or non-conductive materials.

As shown in FIG. 5B, a fill layer 52 of electrically conductive material is deposited into the void area 50, optionally by deposition nozzle 16 (FIG. 1), to form a pin 54 that cures/hardens through the inter-layer void 50 to provide a portion of the conductive pathway 26 extending through multiple layers 44, 46 in the Z-direction. The pin 54 also provides Z-direction structural strength to the conductive pathway 26. Z-pinning is but one example of an additive manufacturing method for the structure 20. Other methods may be used, including layer-by-layer deposition of the non-conductive and conductive materials.

Figure 6:
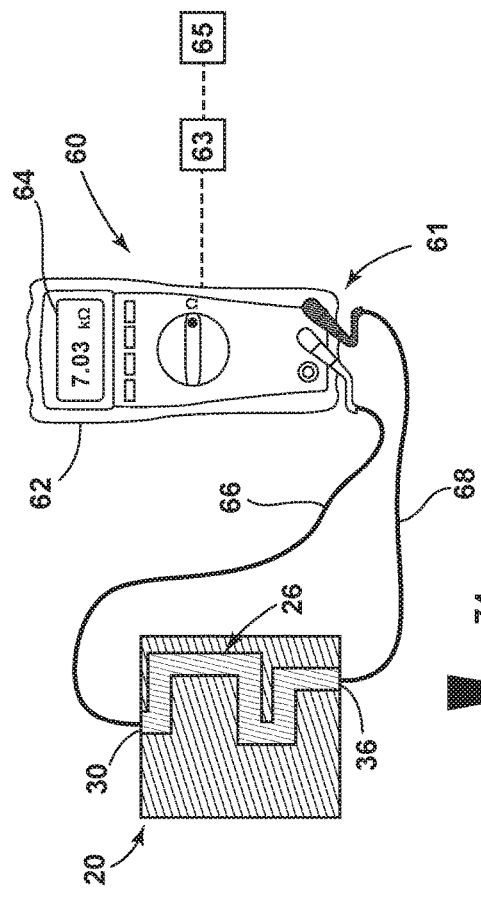
FIG. 6 is a schematic illustration of one embodiment of a system for detecting and identifying a defect in an article comprising a 3D printed polymer structure.

FIG. 6 shows one embodiment of a system 60 for detecting and identifying a defect in an article, such as an article including or comprising the polymer structure 20 from FIGS. 2-4. The system 60 includes a sensor 61 that monitors the structural health of the article. The sensor 61 can comprise, in one embodiment, the embedded or integrated conductive pathway 26 and a resistance detector 62 that monitors the resistance of the conductive pathway 26 and detects changes in resistance indicative of a structural defect. The conductive pathway 26 can be monitored continuously or intermittently.

Sensor 61 can be configured to output signals corresponding to a sensed resistance of the conductive pathway 26. The output signals can be received by a controller 63 connected to the sensor 61, such as to the resistance detector 62, which analyzes the signals to determine if the output signals are indicative of the formation of a defect in the article, and optionally also determine the location of the defect within the article, a dimension of the defect, such as a length of crack, or any combination thereof.

Controller 63 may be constructed of any electrical component, or group of electrical components, that is capable of carrying out the functions described herein. In many embodiments, controller 76 is a conventional microcontroller, although not all such embodiments need include a microcontroller. The controller 63 may include any suitable controller, including any suitable combination of a CPU, processor, microprocessor, computer, and/or other hardware, software, or firmware that is capable of carrying out the functions described herein, and any combination thereof over various common peripheral devices or components associated with such items. In one embodiment, the controller 63 includes at least a processor (including, but not limited to, a CPU or microprocessor), with the processor executing instructions for any embodiment of monitoring method disclosed herein. The instructions executed by the processor, as well as the data necessary for carrying out these functions, may be stored in a memory accessible by the controller 63.

Optionally, a visual or auditory alert system 65 is coupled with the system 60 and generates an alert if a defect or crack is detected. The alert system 65 can be configured to deliver a visual and/or audible alert when a defect is detected, such as by illuminating a light, sounding an alarm, or showing an alert on display or user interface. In one embodiment, the alert system 65 can comprise a display, and a generated alert can be delivered on the display. Optionally, the alert can include information such as a notification of the formation of a defect, the location of a defect, a size or length of a defect, a notification of the propagation of a defect, the direction of propagation for a defect, or any combination thereof.

The resistance detector 62 can comprise a digital multimeter or similar diagnostic tool that is used to measure resistance, and can include a display 64 where measurement readouts can be viewed and input jacks where two test leads 66, 68 are inserted. The test leads 66, 68 plug into the input jacks and serve as the conductor from the structure 20 being tested to the multimeter 62. Probe tips 70, 72 on each test lead 66, 68 are connected to the contact pads 30, 36 of the conductive pathway 26. Resistance can then be measured across the length of the conductive pathway 26. To measure resistance, the multimeter 62 passes a current through the structure 20, and the display 64 shows the resultant resistance. An increase in resistance above a threshold value indicates that a crack has formed or propagated in the structure 20. The threshold value can be based off an initial resistance reading, for example, when a printed structure is completed, and the configuration of the circuit.

Figure 7:
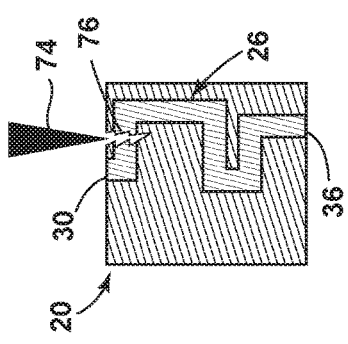
FIG. 7 is a schematic illustration of a mechanical load being applied to the article of FIG. 6.
Figure 8:
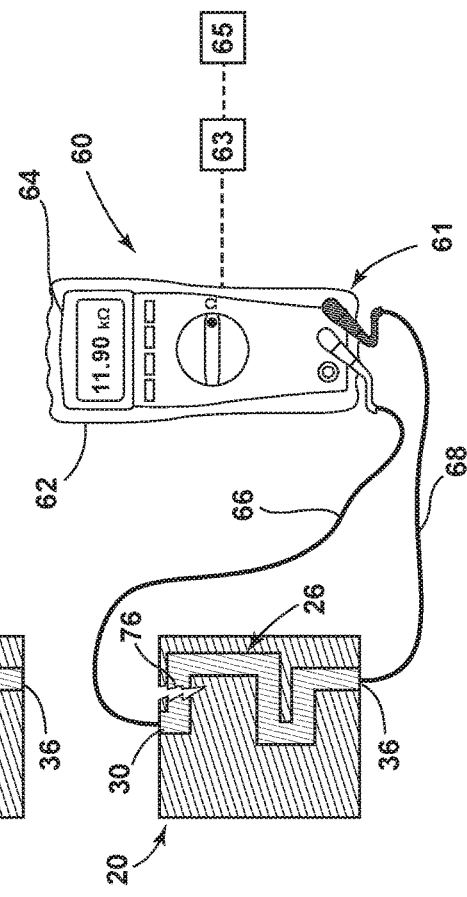
FIG. 8 is a schematic illustration of a crack being detected in the article using the system of FIG. 6.

FIGS. 6-8 also illustrates the change in resistance before and after a mechanical failure of the structure 20 from FIGS. 2-4. In FIG. 6, the resistance measured across the conductive pathway 26 for a structurally healthy structure 20 is shown as 7 kΩ (kiloohm). This value is exemplary. FIG. 7 shows a mechanical load 74 being applied to the structure 20, and the structure 20 being split across the layer interface of the embedded conductive material by the mechanical load 74. In particular, a crack 76 is propagated across the conductive pathway 26, in the Z-direction. FIG. 8 shows the resulting resistance change measured across the conductive pathway 26. In particular, the resistance increases after crack propagation. In FIG. 8, the resistance measured across the conductive pathway 26 with crack 76 is shown as 12 kΩ. This value is exemplary. By monitoring resistance and identifying an increase in resistance indicative of a defect formation, such as the crack 76 shown.

One embodiment of a method for monitoring the structural health of a an article comprising 3D printed polymer structure will now be described with respect to the system 60 of FIG. 6-8. It will be understood that the method is applicable to other systems and articles. The method includes loading the article as shown in FIG. 7. During loading, a defect may or may not be formed in the structure. The method further includes measuring resistance across the circuit to determine a resistance value. The resistance can be measured after the loading shown in FIG. 7, or during the loading shown in FIG. 7, including being monitored intermittently or continuously during or after loading.

Next, the measured resistance value is comparted to a known resistance value. The known resistance value can, for example, be a resistance value measured across the circuit prior to loading the article, as shown in FIG. 6. Alternatively, the known resistance value can be a resistance value measured across the circuit prior during a previous loading cycle of the article, which can be useful when determining crack growth or propagation, as described in further detail below. As yet another alternative, the known resistance value can be calculated or estimated based on the circuit design. Optionally, the measured resistance value is comparted to multiple resistance values, which can be useful when determining crack location or length, as described in further detail below.

Based on the comparison of the measured resistance value to the known resistance value, the controller 63 can determine whether a defect is present in the 3D printed polymer structure 20. By monitoring resistance, the condition of the circuit can be determined, including whether cracks have formed through the circuit. The higher the resistance, the lower the current flow through the circuit, and vice versa. Optionally, the controller 63 can further determine the location of the defect, a size or length of the defect, the propagation of the defect, the direction of propagation for the defect, or any combination thereof.

A further step of the method may optionally including scheduling and/or performing maintenance on the structure to correct the defect. The maintenance can be scheduled by the controller 63.

Yet another step of the method may optionally include generating an alert or notification indicating that a crack has formed and/or propagated in the structure. The alert can be generated by the alert system 65.

Figure 9:
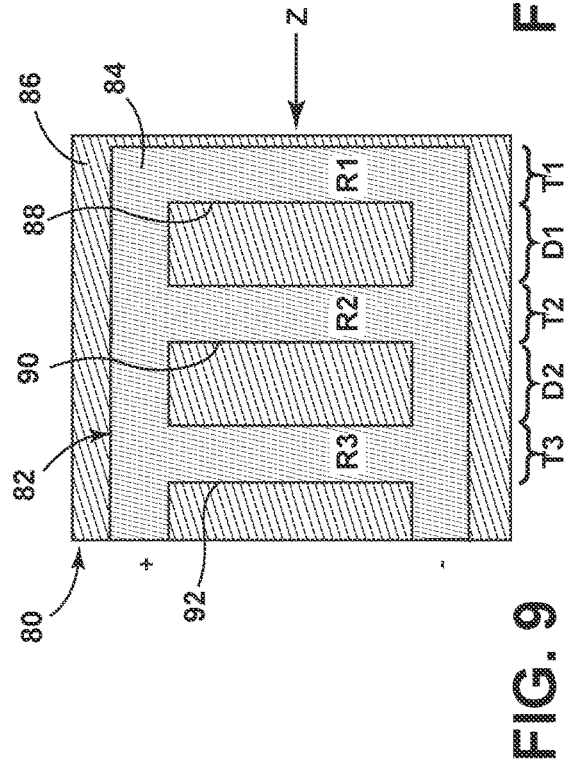
FIG. 9 is a schematic illustration of another embodiment of a 3D printed polymer structure, the structure comprising a parallel circuit for detecting the formation, propagation, location, and/or length of a crack.

In another embodiment of the method, in addition to determining when a crack is formed or propagated in a structure, the location and length of the crack can be determined. To find the crack length and location, a structure can be printed in such a way to detect both features. FIG. 9 shows one embodiment of a 3D printed polymer structure 80 with a customized circuit 82 of conductive material 84 integrated within a non-conductive material 86, and which can self-sense not only the formation of a crack, but also crack length and location. The structure 80 is printed with conductive material 84 designed and fabricated to form a parallel circuit 82 in which the resistance can be measured, analyzed, and correlated to the internal changes of the printed structure. The resistance of the printed parallel circuit 82 can be expressed as Equation (1):

$$R = \frac{\rho L}{A}$$

where ρ is the resistivity, L is the length of the printed circuit and A is the cross sectional area of the circuit. Using Equation (1), crack length and location can be determined for the structure of FIG. 9 according to the following method.

The parallel circuit 82 shown in FIG. 9 has multiple conductive pathways for electricity to flow. The circuit 82 shown comprises three pathways or branches 88, 90, 92 printed within the additive manufactured structure. Optionally, the branches 88, 90, 92 can be elongated along or extend along one direction, and can have a thickness measured in a direction perpendicular to the extension direction. For example, the branches 88, 90, 92 shown herein can have a thickness measured in the Z-direction and have a length measured in a direction perpendicular to the Z-direction.

Portions of the parallel circuit 82, including portions of one or more of the branches 88, 90, 92, can be printed using the Z-pinning method described previously, or using layer-by-layer deposition of the non-conductive and conductive materials. In one embodiment, as printed structures are generally weaker in the Z-direction (i.e. the direction perpendicular to X-Y plane in which material is deposited), and a majority defects form at the layer-to-layer interfaces, the branches 88, 90, 92, can be perpendicular, or substantially perpendicular, to the Z-direction. By substantially perpendicular, the branches 88, 90, 92 can deviate from perpendicular to the Z-direction up to 5 degrees, up to 10 degrees, or up to 15 degrees. The parallel circuit 82 shown, with branches 88, 90, 92 perpendicular to the Z-direction can detect crack propagation in the Z-direction, layer debonding, and/or delamination.

In case a crack propagates in a nonconductive section of the structure, the parallel circuit 92 can be used to find crack location and/or crack length. The parallel circuit 82 uses contributions from the resistance of every branch 88, 90, 92 to create an effective resistance. For example, the first branch 88 has a first resistance R1, the second branch 90 has a second resistance R2, and the third branch 92 has a third resistance R3. The total effective resistance (Rt) of the printed circuit 82 can be expressed as Equation (2):

$$\frac{1}{Rt} = \frac{1}{R1} + \frac{1}{R2} + \frac{1}{R3}$$

As branches in the parallel circuit 82 fail, the effective resistance changes according to the branches that remain undamaged to create a new effective resistance. By controlling the area, length, and resistance of each individual branch 88, 90, 92, changes in total effective resistance can be used to determine where a detected defect is.

Figure 10:
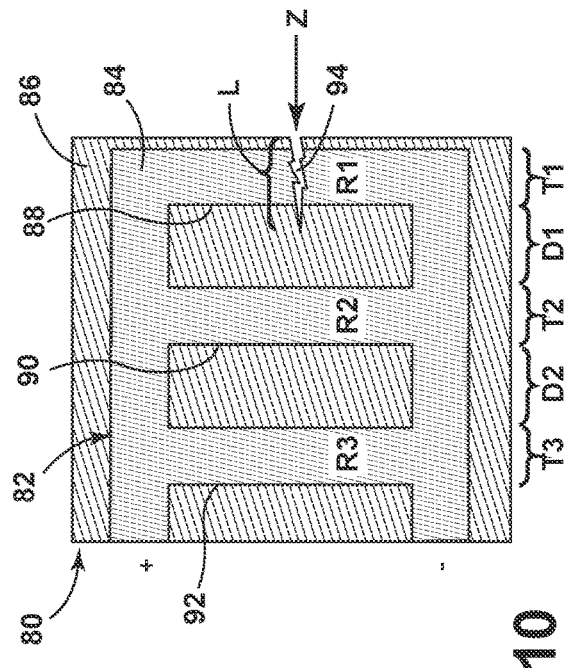
FIG. 10 is a schematic illustration showing the formation of a crack in the structure from FIG. 9.
Figure 11:
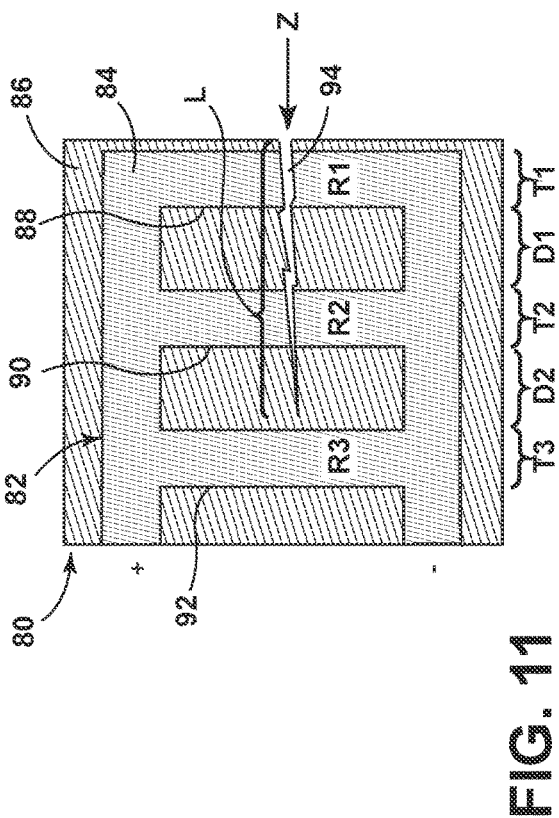
FIG. 11 is a schematic illustration showing the growth or propagation of the crack from FIG. 10.

FIG. 9 shows a structurally healthy, defect-free circuit 82. FIG. 10 illustrates the formation of a crack 94 across the first branch 88 and into a section of the non-conductive material 86 between the first and second branches 88, 90. FIG. 11 illustrates the growth or propagation of the crack 94 across the second branch 90 and into a section of the non-conductive material 86 between the second and third branches 90, 92.

A resistance monitoring device, optionally the resistance detector 62 (FIG. 6), monitors the circuit 82 to determine a resistance of the circuit 82, which provides an indication of the health of the structure 110, and provides an indication of the location and/or size of a defect that alters the resistance of the circuit 82. The parallel circuit 82 can provide a unique resistance when one or more of the branches 88, 90, 92 are broken by crack propagation. By using different resistive values (R1, R2, R3) for each branch 88, 90, 92 of the circuit 82, the change in total effective resistance will correspond to one or more of the individual branches, allowing crack location to be identified. For example, the circuit 82 can have a first total effective resistance $Rt_1$ when the circuit 82 is structurally-healthy as shown in FIG. 9, i.e. no cracks formed in any of the branches, a second total effective resistance $Rt_2$ when the first branch 88 is broken as shown in FIG. 10, a third total effective resistance $Rt_3$ when the first and second branches 88, 90 are broken as shown in FIG. 11, and so on. With each broken branch, the total effective resistance increases. In theory, if all branches 88, 90, 92 are broken, the total effective resistance goes to infinity. In practice, a fourth total effective resistance $Rt_4$ may be measured after complete failure of the circuit 82 has occurred, i.e. after all three branches 88, 90, 92, are broken. The actual resistance values for each condition are unique depending on the design of the parallel circuit 82. The location of a crack can be determined by comparing the resistance measured to a lookup table of unique resistance values and corresponding crack locations for the parallel circuit 82.

Further, by controlling the thickness of the branches and spacing between branches, changes in total effective resistance can be used to estimate how large a detected defect is. For example, the first branch 88 has a first thickness T1, the second branch 90 has a second thickness T2, and the third branch 92 has a third thickness T3. The first branch 88 and the second branch 90 of the parallel circuit 82 are spaced by a known distance D1, and the second branch 90 and the third branch 92 are spaced by a known distance D2. If a change in total effective resistance indicates that the first branch 88 is broken but the second branch 90 is not broken, then the crack length (L) is estimated to be T1<L<(T1+D1). If a change in total effective resistance indicates that the first and second branches 88, 90 are broken but the third branch 92 is not broken, than the crack length (L) is estimated to be (T1+D1+T2)<L<(T1+D1+T2+D2). It is noted that in some cases, the thickness of the branches may be negligible for the purposes of crack length estimation, particularly if the thickness of the branches is very fine in comparison to the distance separating the branches.

By concentrating the branches 88, 90, 92 close together and/or by decreasing the thickness of the branches 88, 90, 92, the accuracy of the estimation improves. The actual resistance values for each length estimation range are unique depending on the design of the parallel circuit 82. The length of a crack can be estimated by comparing the resistance measured to a lookup table of unique resistance values and corresponding length estimation ranges for the parallel circuit 82.

In yet another embodiment, the parallel circuit 82 can be used to detect the growth or propagation of the crack 94, and the direction in which the crack 94 is propagating. By monitoring the circuit 82 for changes in total effective resistance, it can be detected when a previously unbroken branch is now broken. From this information, it can be determined that a previously identified crack has propagated. For example, the crack 94 shown in FIG. 10 can be identified as being present in the structure 80 when the change in total effective resistance indicates that the first branch 88 is broken. Propagation of the crack 94 as shown in FIG. 11 can be identified when the change in total effective resistance indicates that the second branch 90 is now broken, after previously been unbroken. The direction in which the crack 94 is propagating can be determined by tracking the sequence in which branches 88, 90, 92 are broken and knowing the spatial relationship of the branches 88, 90, 92 relative to each other. For example, it can be determined that the crack 94 shown in FIGS. 10-11 is propagating in the Z-direction by determining that the second branch 90 is broken after the first branch 88 and knowing that the second branch 90 is spaced from the first branch 88 in the Z-direction.

It is noted that a circuit 82 with the same resistive values (R1, R2, R3) for each branch 88, 90, 92 can be used to identify crack length using this method if the thickness T1, T2, T3 of each branch 88, 90, 92 is the same and if the distances D1, D2 are the same. A circuit 82 with different resistive values (R1, R2, R3) for each branch 88, 90, 92 can be used to identify crack length and/or crack location, as the change in total effective resistance will correspond to one or more of the individual branches, allowing crack location to be identified. This will further allow crack length to be estimated even when the branch thickness T1, T2, T3 are not the same or when the distances D1, D2 are not the same.

The parallel circuit 82 shown in FIGS. 9-11 is configured to detect cracks in the Z-direction. Optionally, by orienting the branches 88, 90, 92 to be perpendicular, or substantially perpendicular, to the X-direction or Y-direction, the same parallel circuit 82 can be used to detect cracks in the X- or Y-direction, using the methods described above.

It is noted that while FIGS. 10-11 show branches being fully broken, the method is also applicable in cases where a branch is only partially broken by a defect. As the cross-sectional area of the sensing circuit decreases, i.e. due to partial break in one or more of the branches, the overall resistance increases because resistance is inversely proportional to the area, as it can be observed from Equation (1). Therefore, even a partially broken branch can demonstrate an increase in resistance that is detectable by the various embodiments of methods and systems disclosed herein.

Figure 12:
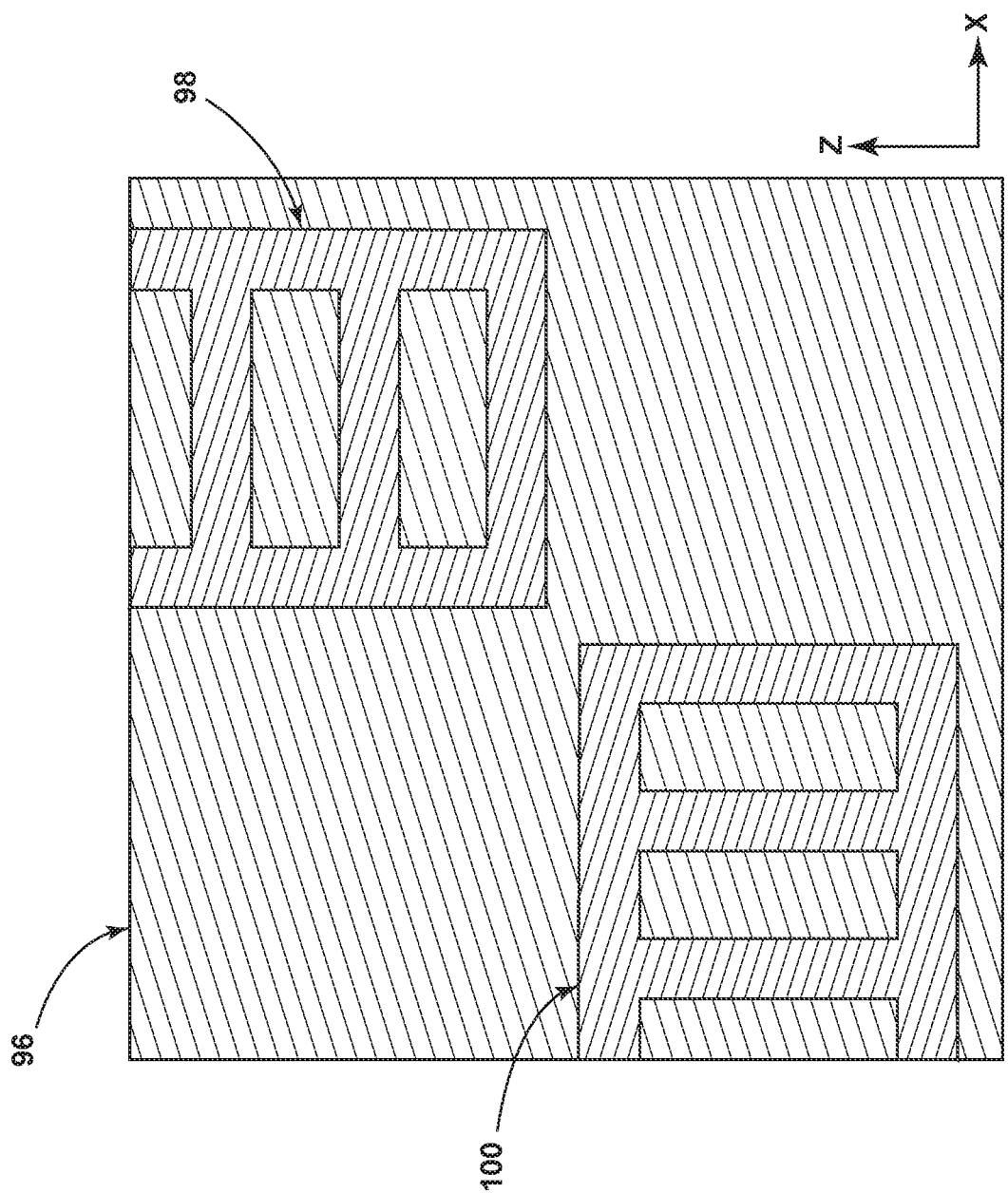
FIG. 12 is a schematic illustration of another embodiment of a 3D printed polymer structure, the structure comprising multiple parallel circuits for detecting the formation, propagation, location, and/or length of a crack in two directions.

FIG. 12 shows one embodiment of a 3D printed polymer structure 96 with multiple parallel circuits 98, 100, which can self-sense not only the formation of a crack in multiple directions, but also determine crack length and/or location in multiple directions. For example, the first parallel circuit 98 can be configured to detect cracks in the Z-direction, while the second parallel circuit 100 can be configured to detect cracks in the X-direction. Additional circuits (not shown) can be printed with the structure 96, including at least one parallel circuit configured to detect cracks in the Y-direction. Each of the parallel circuits can be monitored for changes in resistance, as described previously, and analyzed for defects in the printed structure 96.

FIGS. 13-15 show one embodiment of a 3D printed polymer structure 110 with multiple circuits 112, 114, 116 which can self-sense not only the formation of a crack in multiple directions, but also determine crack length and/or location in multiple directions. The circuits 112, 114, 116 are printed of conductive material integrated within a non-conductive material 124, and which can self-sense not only the formation of a crack, but also crack length and location in three dimensions (X, Y, and Z). In order to provide location and length information, multiple circuits 112, 114, 116 may be, for example, arranged as an array of conductive pathways in respective coordinate directions.

In one arrangement for detecting crack location and length, the structure 110 comprises a first circuit 112 including a plurality of spaced electrically-conducting pins 118 extending in a first coordinate direction, shown herein as the X-direction, a second circuit 114 including a plurality of spaced electrically-conducting pins 120 extending in the first coordinate or X-direction, and a third circuit 116 including a plurality of spaced electrically-conducting pins 122 extending in the first coordinate or X-direction. The pins of one circuit may be spaced from the other pins of the same circuit in a second coordinate direction that is orthogonal to the first coordinate direction. The second coordinate direction is shown herein as the Z-direction. The circuits 112, 114, 116 may be spaced from each other in a third coordinate direction which is orthogonal to the first and second coordinate directions. The third coordinate direction is shown herein as the Y-direction. As shown in FIG. 15, the circuits 112, 114, 116 may be generally arranged to provide columns and rows of pins 118, 120, 122 of conductive polymer material printed with the non-conductive polymer material 124 through additive manufacturing, and by monitoring changes in resistance with reference to the rows and columns of pins 118, 120, 122, an indication of the location of a defect in three dimensional space and/or the size of a defect can be provided.

A resistance monitoring device, optionally comprising multiple resistance detectors 62 (FIG. 6), monitors the circuits 112, 114, 116 to determine a total effective resistance of the each circuit, which provides an indication of the health of the structure 110, and provides an indication of the location and/or size of a defect that alters the resistance of one or more circuits 112, 114, 116, as described previously.

As shown in FIG. 3C, there are three circuits 112, 114, 116 with pin sets that are parallel to each other, with one top contact pad 126, 128, 130 for each circuit 112, 114, 116, respectively. Each circuit 112, 114, 116 includes three pins 118, 120, 122, respectively. All three of the circuits 112, 114, 116 can be connected to a common ground. Because the circuits 112, 114, 116 all share the same ground, but do not have the same top connection, i.e. each has its own contact pad 126, 128, 130, the signal read from each circuit 112, 114, 116 relates to the pins 118, 120, 122 of that circuit 112, 114, 116. As a result, if a crack propagates in the first circuit 112, then the resistance of the first circuit 112 will increase, indicating that a crack is somewhere in the section of the part that corresponds to the first circuit 112.

Each pin 118, 120, 122 of each circuit 112, 114, 116 can have a different thickness or diameter in the second coordinate direction or Z-direction, which provides each pin with a different resistive values. The pins of a circuit can also be spaced by different distances. Referring to FIG. 14, and using the first circuit 112 as an example, the first circuit includes three pints 118, including a first pin 118A having a first thickness T1, a second pin 118B having a second thickness T2, and a third pin 118C having a third thickness T3. The first and second pins 118A, 118B are spaced by a first distance D1, and the and third pins 118B, 118C are spaced by a second distance D2. Using the resistive values, pin diameter, and pin spacing for each circuit, the length and/or location of a crack can be determined, using the method described above with respect to FIGS. 9-11. As shown herein, each pin is cylindrical. Other geometric shapes for the pins are possible.

In another embodiment, of a 3D printed polymer structure can self-sense strain within the article. For example, the conductive material of any of the structures 20, 80, 96, 110 shown herein can have a resistance that fluctuates based on strain in the structure, and can be used as a stain gauge. The conductive material may be selected to have a gauge factor that is higher than that of the non-conductive material. As a result, the circuit can act as a strain gauge to measure strain from bending, expansion, and torsional loads, including monitoring strains within a structure prior to damage and after damage. In certain embodiments, the structure can also self-sense cracks, as discussed previously, as well as strain.

The placement and resolution of the structural health monitoring system may be tailored to provide preferential diagnostic capabilities at critical areas of the structure. Optionally, Finite Element Analysis (FEA) can be utilized in order to identify the critical areas (i.e. high stress) in 3D printed structures during service loading. This data will be used to optimize the location, size and shape of the 3D printed health monitoring circuits. From a simulation standpoint, parts that are going to be additive manufactured can be analyzed in FEA software to determine where the stress and strains in the printed part will be highest. The software then takes the stress and strain locations to create a sensing circuit with a custom mesh of pathways to detect defects in the part. The mesh can be denser in areas simulated to experience high stress or strain and less dense in areas simulated to experience less stress or strain. As a result, the final mesh used for each printed part can be custom made to optimize the sensing capabilities of the sensing circuit for ease and accuracy of measurements, while judiciously using the conductive material, which generally costs more than the non-conductive material.

Example

Sample printed structures were prepared and tested according to the following example, which is intended to be non-limiting.

Neat PLA filament from Matterhackers was used as a feedstock material for printing the structure. A graphene filled PLA with a resistivity of 0.6 Ω·cm was used as a feedstock material for printing the integrated circuit. The graphene filled PLA from Black Magic 3D has a graphene content of 5% by weight. A MakerGear M2 printer with a dual extruder was used to print the sample, using a printing speed of 60 mm/sec and a melting temperature of 215° C.

Figure 16:
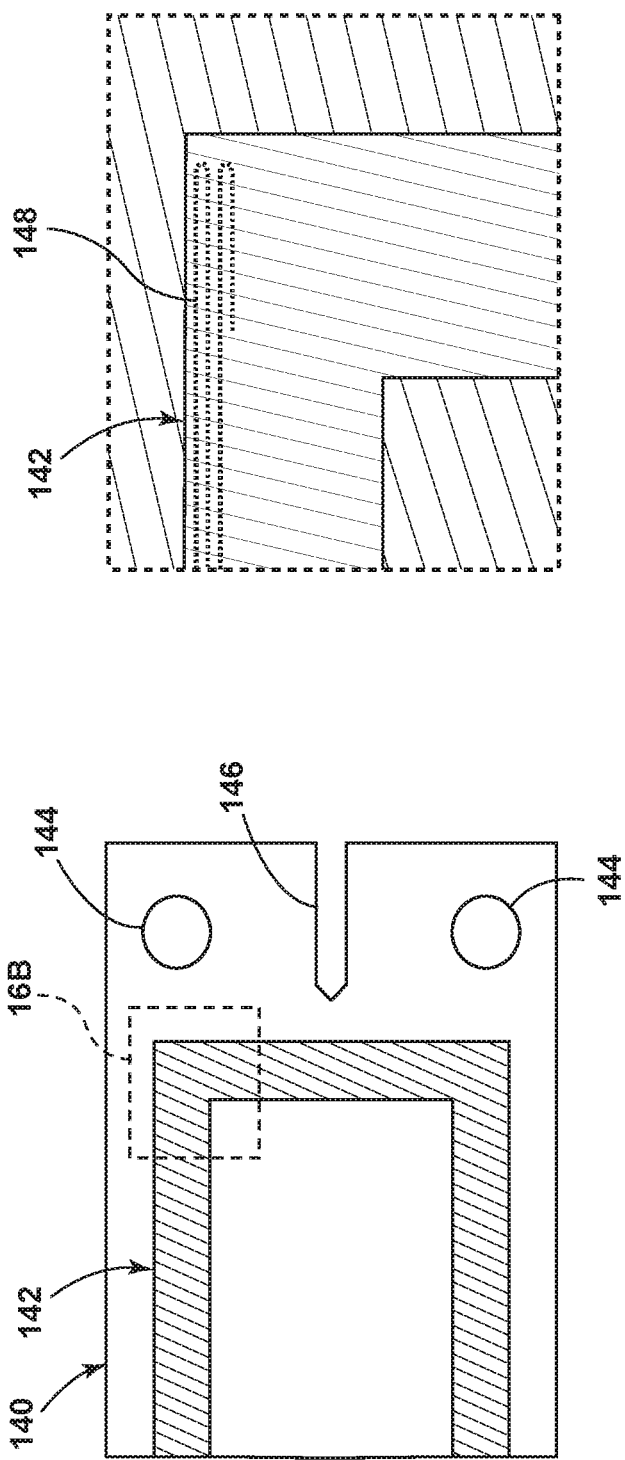
FIG. 16A shows a sample prepared for testing according to one example, the sample comprising a 3D printed structure with an integrated parallel circuit for structural health monitoring.
FIG. 16B is a close-up view of section 16B of FIG. 16A, showing a 0° infill pattern, indicated in dotted line, used to print the sample of FIG. 16A.

Four samples were printed with a single circuit path. FIG. 16A shows a 3D printed sample 140 with the integrated parallel circuit 142 for structural health monitoring. The sample 140 included two clevis pin holes 144 for mounting the sample 140 for testing. In order to control the location of crack propagation, the sample 140 was designed for fracture toughness tests with a designed notch 146 at the middle of the sample 140 to initiate the crack.

FIG. 16B is a close-up view of section 16B of FIG. 16A, showing a 0° infill pattern, indicated by the dotted line path 148, used to print the sample 140. The infill pattern was chosen to represent the layer-to-layer interactions observed in the out of plane direction. Because the out of plane direction in FFF printing is the weakest direction, most structural failures should start between the printed layers. To predesign the delamination failure mechanism, the structure should be printed in an orientation that the crack will propagate in the Z-direction during testing. However, printing tall structures with relatively thin bases is challenging due to the low stability during the build process. To overcome this challenge, the 0° infill pattern was chosen to represent the weakest axis.

Figure 17:
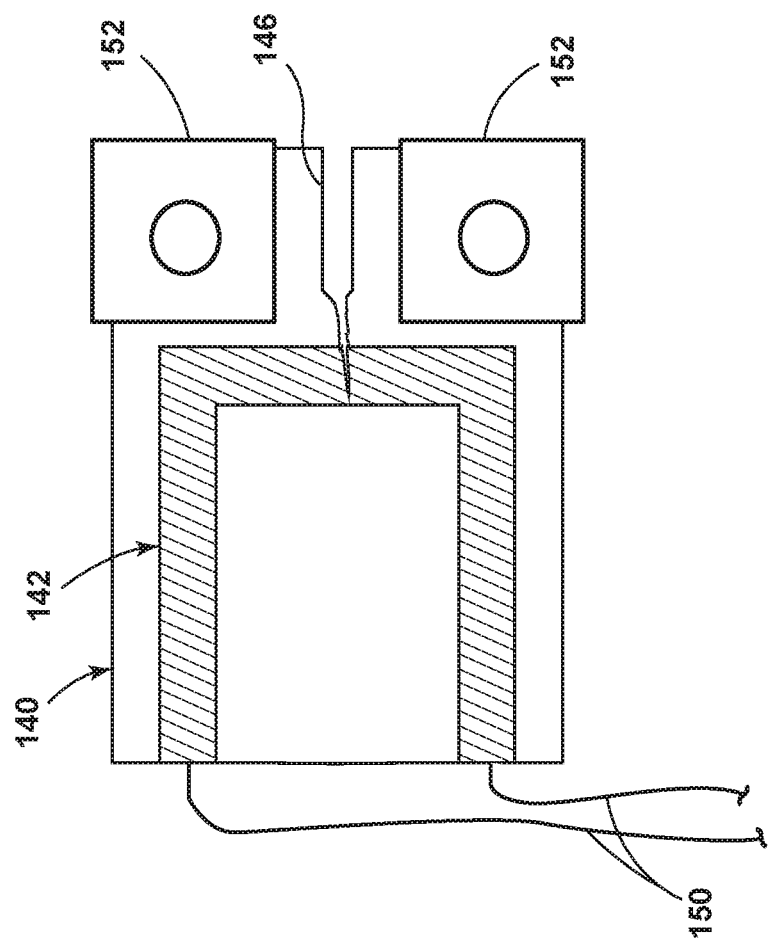
FIG. 17 is a schematic illustration of a test setup for the sample of FIG. 16A.

As shown in FIG. 17, to reduce the measurement noise and fluctuations in the resistance measurements to the rough surface of the printed sample 140, wires 150 were integrated to the conductive material, in the positive and negative ends, to measure the resistance. The samples 140 were tested under tensile loading using a universal testing machine (MLP-500) with a rate of 20 mm/min, using clevis pins 152 to hold the sample 140. A digital multi-meter (Fluke 87 III) was used to acquire the resistance measurements. A reading every 5 seconds was acquired and plotted versus tensile force and time during the duration of the test until fracture.

Figure 18:
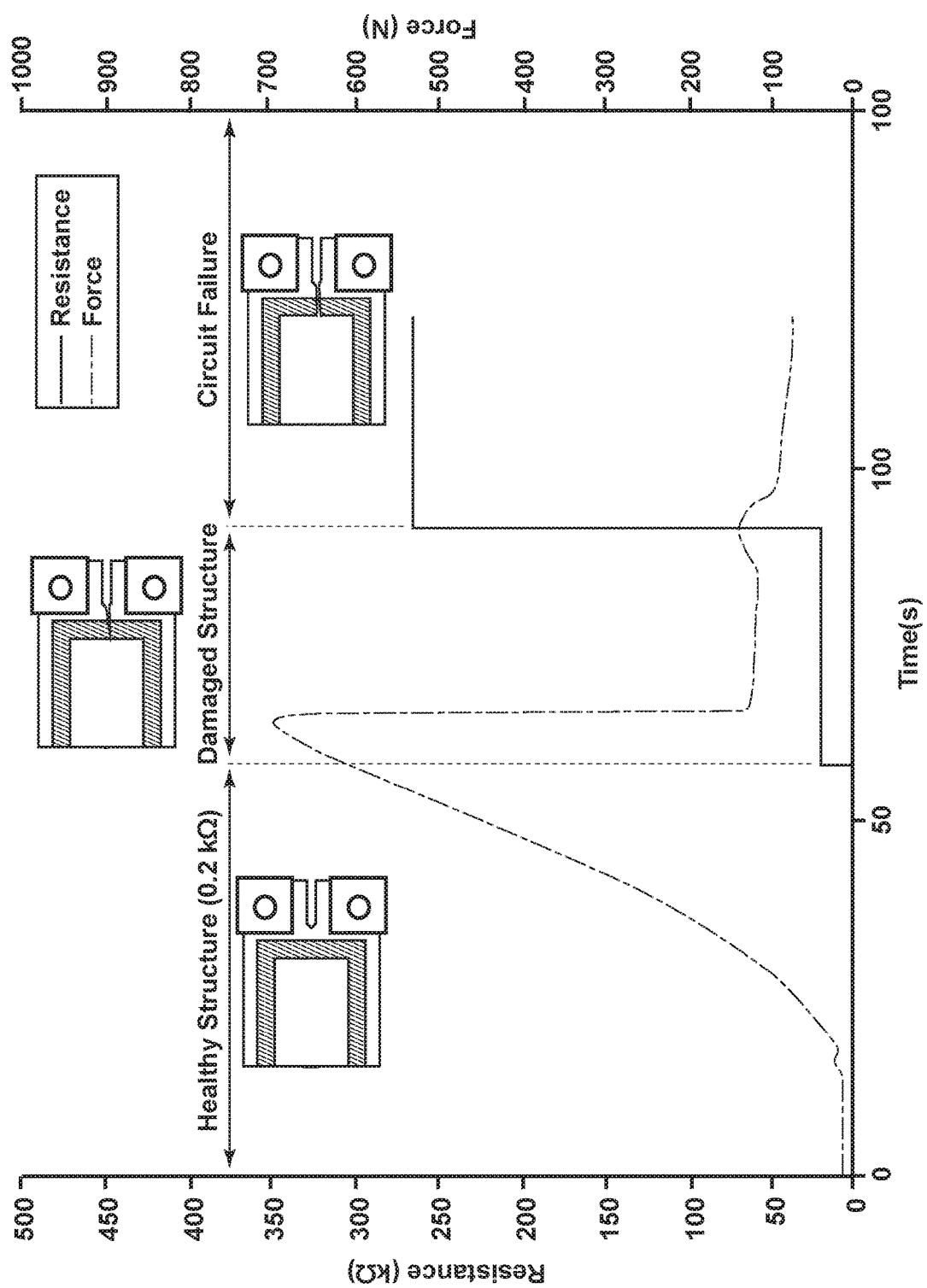
FIG. 18 is a graph showing a resistance measurement in relation to force applied over time to the sample of FIG. 16A using the test setup schematically illustrated in FIG. 17.

FIG. 18 is a graph showing the resistance measurement in relation to the force applied to one of the samples 140 over time. Four samples were tested in order to evaluate the repeatability of the experiment. All the samples showed a similar behavior and trend as depicted in the graph of FIG. 18.

The graph can be separated to three distinguished regions: the healthy structure region; the damaged structure region; and the circuit failure region. The first region or healthy structure region shows that the resistance measurement for a healthy (i.e. no defects) sample was 0.2 kΩ. Change in this value indicated a change in the state of the internal structure of the sample. It can be seen that loading the sample 140 resulted in a crack propagation initiated at the notch 146 in a controlled manor (see FIG. 17). In the second region or damaged structure region, the resistance measurement increased to 20 kΩ when the crack propagated through the circuit 142. It was observed that the resistance measurement started to change approximately 5 seconds before the failure of the sample 140 (i.e. the drop in the load curve). While not being limited to any particular theory, it is believed that early stage crack formation can therefore be detected, and monitored for further propagation before failure, by measuring resistance and monitoring changes in resistance. For example, the graph shows that the conductive circuit 142 sensed the crack propagation before full failure of the sample 140. In the third region or circuit failure region, the resistance measurement spiked up to ~250 kΩ when the crack propagated throughout the entire circuit 142, leading to a complete circuit failure. As the contact area used in sensing (i.e. conductive material) decreases, the overall resistance increases. Resistance is inversely proportional to the contact area, as it can be observed from Equation (1). In theory, the resistance should go to infinity when the crack propagates throughout the entire circuit 142, however the other materials of the system have a base resistance, and other factors contribute to a reading still being measured after complete circuit failure has occurred. The difference between resistance readings in each region (i.e. failed 250 kΩ, damaged 20 kΩ, and healthy 0.2 kΩ) is very distinguishable and can be used for monitoring defect formation in printed structures.

Various embodiments of the methods, systems, and articles of the present invention measure resistance of a circuit and determine whether a defect in present in a structure based on changes in resistance. In other embodiments, the present invention may measure any other characteristic of power or electrical property of a circuit that changes based on a defect or crack forming in a conductive pathway of the circuit, such as, but not limited to, impedance, capacitance, inductance, voltage or current.

There are several advantages of the present disclosure arising from the various aspects or features of the apparatus, systems, and methods described herein. For example, the various embodiments of the systems and methods disclosed herein use self-sensing material integrated into a 3D printed structure to detect internal defects such as crack formation and propagation during service loading. Such defects can be detected in early stages before catastrophic failure of the printed structure. Embodiments disclosed herein allow for detection and monitoring of layer debonding and delamination, which may be useful for FFF and direct write structure that suffer from poor layer-to-layer adhesion.

Another advantage of the various embodiments disclosed herein is that a self-sensing article and structural health monitoring system can be manufactured concurrently by additive manufacturing, using a single piece of equipment and without post-machining or post-processing. This equipment can be low cost. The structural health monitoring system can contribute to structural integrity of the article with mechanical performance of the conductive material being similar to the non-conductive material.

The design freedom of additive manufacturing provides many possibilities for different circuit designs. Sensing circuits can be optimized based on expected failure points. As an example, if a certain area of a structure showed a concentration of high stress fields, the density of the conductive pathways can be increased for enhancing the sensing capabilities. However, the rest of the structure can contain less conductive sensing material.

Embodiments of the methods disclosed herein be used to produce articles which detect and monitor damage location and propagation along one direction, one plane (i.e., two directions), or multiple planes (i.e., three directions). Such a method allows embedding of the structural health monitoring system within the article, therefore shielding the sensing circuit(s) from unintended damage and degradation.

Yet another advantage is that the location of a sensing circuit in the 3D printed structure can be tailored to the geometry and loading conditions of the structure, without added manufacturing difficulty and cost. The location and configuration of a sensing circuit can be generated automatically using part geometry and simulation results of expected loading scenarios. Embodiments of the method enable the manufacture of sensing grids, which detect crack location along an arbitrary plane with a single sensing circuit.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A method for monitoring the structural health of an article, comprising:
   providing an article having at least one 3D printed polymer structure printed from a non-conductive polymer material and a conductive polymer material, the conductive polymer material forming a parallel circuit comprising multiple conductive pathways of the conductive polymer material through the non-conductive polymer material, wherein the non-conductive and conductive polymer materials are deposited in multiple layers incremented in a first direction, and the multiple conductive pathways extend along a second direction that is substantially perpendicular to the first direction, and the multiple conductive pathways are spaced from each other in the second direction by known distances;
   loading the article;
   during or after loading, measuring a resistance across the parallel circuit to determine a measured resistance value;
   comparing the measured resistance value to multiple known resistance values, each one of the multiple known resistance values indicative of a break in at least one of the multiple conductive pathways; and
   determining, based on the comparison:
      whether a defect is present in the 3D printed polymer structure;
      an estimated length of the defect based on which of the multiple conductive pathways are indicated as comprising a break and based on the known distances; and
      at least one of:
         a propagation of the defect within the 3D printed polymer structure; and
         a direction of propagation of the defect within the 3D printed polymer structure.

2. The method of claim 1, comprising measuring at least one prior resistance across the parallel circuit prior to loading the article to determine at least one of the known resistance values.

3. The method of claim 1, comprising monitoring the resistance across the parallel circuit continuously during loading.

4. The method of claim 1, wherein determining, based on the comparison, whether the defect is present in the 3D printed polymer structure comprises determining whether the measured resistance value is greater than the known resistance values.

5. The method of claim 4, wherein determining, based on the comparison, whether the defect is present in the 3D printed polymer structure comprises determining whether a difference between the measured resistance value and the known resistance values is greater than a threshold value.

6. The method of claim 1, wherein:
   the article comprises multiple circuits, each circuit comprising at least one conductive pathway through the non-conductive polymer material;
   during or after loading, measuring a resistance across each of the multiple circuits to determine a measured resistance value for each of the multiple circuits;
   comparing the measured resistance values for each of the multiple circuits to a known resistance value for each of the multiple circuits;
   determining a location of the defect within the 3D printed polymer structure.

7. A method for monitoring the structural health of an article, comprising:
   providing an article having at least one 3D printed polymer structure printed from a non-conductive polymer material and a conductive polymer material, the conductive polymer material forming a parallel circuit having multiple conductive pathways, wherein the non-conductive and conductive polymer materials are deposited in multiple layers incremented in a first direction, and the multiple conductive pathways extend along a second direction that is substantially perpendicular to the first direction, wherein the multiple conductive pathways are spaced from each other in the second direction by known distances;
   loading the article;
   during or after loading, measuring a resistance across the parallel circuit to determine a measured resistance value;
   comparing the measured resistance value to multiple known resistance values, each one of the multiple known resistance values indicative of a break in one of the multiple conductive pathways;
   determining, based on the comparison:
      whether a defect is present in the 3D printed polymer structure;
      a location of the defect based on which of the multiple conductive pathways are indicated as comprising a break;
      an estimated length of the defect based on which of the multiple conductive pathways are indicated as comprising a break and based on the known distances; and
      at least one of:
         a propagation of the defect within the 3D printed polymer structure; and
         a direction of propagation of the defect within the 3D printed polymer structure.

8. The method of claim 1, comprising generating an alert indicating that the defect is present in the 3D printed polymer structure.

9. The method of claim 8, wherein the alert indicates at least one of:
- the location of the defect within the 3D printed polymer structure;
- the estimated length of the defect within the 3D printed polymer structure;
- the propagation of the defect within the 3D printed polymer structure; and
- the direction of propagation of the defect within the 3D printed polymer structure.

10. The method of claim 1, comprising scheduling maintenance on the article to correct the defect.

11. The method of claim 1 wherein the
- multiple layers of the non-conductive polymer material are deposited by an additive manufacturing machine in a two-dimensional plane and define a void area extending through the multiple layers of the non-conductive polymer material in a direction perpendicular to the two-dimensional plane;
- wherein a portion of the multiple conductive pathways comprises conductive material deposited by the additive manufacturing machine and filling the void area.

\* \* \* \* \*

UNITED STATES PATENT AND TRADEMARK OFFICE
CERTIFICATE OF CORRECTION

PATENT NO. : 11,199,517 B2
APPLICATION NO. : 16/539184
DATED : December 14, 2021
INVENTOR(S) : Vlastimil Kunc et al.

It is certified that error appears in the above-identified patent and that said Letters Patent is hereby corrected as shown below:

In the Claims

Column 18, Claim 6, Line 26:
"values" should be -- value --

Signed and Sealed this
Nineteenth Day of April, 2022

*Katherine Kelly Vidal*

Katherine Kelly Vidal
*Director of the United States Patent and Trademark Office*